(12) United States Patent
Man

(10) Patent No.: US 11,454,545 B2
(45) Date of Patent: Sep. 27, 2022

(54) SYSTEM AND METHOD FOR DEPTH THERMAL IMAGING MODULE

(71) Applicant: COMPERTUM MICROSYSTEMS INC., Hsin-Chu (TW)

(72) Inventor: Francis Piu Man, Lexington, MA (US)

(73) Assignee: COMPERTUM MICROSYSTEMS INC., Hsin-Chu (TW)

(*) Notice: Subject to any disclaimer, the term of this patent is extended or adjusted under 35 U.S.C. 154(b) by 288 days.

(21) Appl. No.: 16/944,181

(22) Filed: Jul. 31, 2020

(65) Prior Publication Data

US 2021/0270677 A1    Sep. 2, 2021

Related U.S. Application Data

(60) Provisional application No. 62/982,082, filed on Feb. 27, 2020.

(51) Int. Cl.
*G01J 5/08*   (2022.01)
*G02B 3/00*   (2006.01)
*H04N 5/33*   (2006.01)
*G01J 5/00*   (2022.01)

(52) U.S. Cl.
CPC .............. *G01J 5/08* (2013.01); *G02B 3/0062* (2013.01); *H04N 5/33* (2013.01); *G01J 2005/0077* (2013.01)

(58) Field of Classification Search
CPC .... G01J 5/08; G01J 2005/0077; G01J 5/0804; G01J 5/80; G01J 5/0806; G01J 5/20; G01J 5/0275; G02B 3/0062; H04N 5/33; H04N 13/271
See application file for complete search history.

(56) References Cited

U.S. PATENT DOCUMENTS

2013/0155248 A1\* 6/2013 Neeley ............... H04N 5/23222
348/E5.09

FOREIGN PATENT DOCUMENTS

CN    110414392 A    11/2019

\* cited by examiner

*Primary Examiner* — David P Porta
*Assistant Examiner* — Meenakshi S Sahu
(74) *Attorney, Agent, or Firm* — Mayer & Williams PC

(57) ABSTRACT

A depth thermal imaging module, including a thermal imager array, which includes a plurality of at least two thermal imagers that capture thermal radiation of a wavelength of a scene from different viewpoints. Each thermal imager includes a thermal imager chip, a lens stack, and a focal plane with focal length f. The thermal imagers are separated by a baseline distance of 2h and depth measurement Z is performed on an object of interest based on $Z=2hf/\Delta$ where $\Delta$ is the difference in location of the object of interest between its location in the thermal image captured by a first thermal imager and the location of the object of interest in the thermal image captured by a second thermal imager and represents as an offset of the point on the focal plane of the first thermal imager and the second thermal imagers relative to their optical axis.

25 Claims, 8 Drawing Sheets

SYSTEM AND METHOD FOR DEPTH THERMAL IMAGING MODULE

CROSS-REFERENCE TO RELATED APPLICATION

This non-provisional application claims priority under 35 U.S.C. § 119(e) on U.S. provisional Patent Application No. 62/982,082 filed on Feb. 27, 2020, the entire contents of which are hereby incorporated by reference.

BACKGROUND OF THE INVENTION

1. Field of the Invention

The present invention relates to depth imaging, and in particular to a depth thermal imaging module comprising a thermal imager array for measuring depth of or distance to an object.

2. Description of the Related Art

To realize autonomous driving, a vehicle needs to process and interpret sensor information such as sensor data from a Charge-Coupled Device (CCD) camera, a Time Of Flight (TOF) camera (flash-IR-CCD camera), LIght Detection And Ranging (Lidar), radar, and a Global Positioning System (GPS) in order to navigate to a destination, identify its location within a multi-lane road, navigate alongside other vehicles, avoid obstacles and pedestrians, observe traffic signals and signs, and respond to accidents. In addition, an autonomous vehicle also requires sensors in order to operate in all types of driving conditions such as at night, in fog, in snow, and with sun glare.

However, conventional individual sensors fail in various ways. For example, a CCD camera can only operate under normal lighting conditions. CCD images are saturated under sun glare and the CCD camera cannot effectively operate at night or in foggy conditions. To operate at night, an infrared light (IR) is flashed and the CCD captures IR radiation. However, such IR flash operations can only work within close distances (<50 m).

On the other hand, Lidar is capable of operating at night for longer distance (<300 m); however, Lidar cannot function properly in a fog or snow environment due to light scattering and cannot work under sun glare conditions.

To date, there is no single sensor that can operate in most lighting and weather conditions.

BRIEF SUMMARY OF THE INVENTION

An objective of the present disclosure is to provide a depth thermal imaging module comprising a thermal imager array for measure depth of or distance to an object.

In an embodiment, a depth thermal imaging module comprises a thermal imager array, which comprises a plurality of at least two thermal imagers that capture thermal radiation of wavelength of a scene from different viewpoints. Each thermal imager comprises a thermal imager chip, a lens stack, and a focal plane with focal length f. The thermal imagers are separated by a baseline distance of $2h$ wherein depth measurement $Z$ can be performed on object(s) of interest based on $Z=2hf/\Delta$ where $\Delta$ is the difference in location of the object between its location in the thermal image captured by the first thermal imager and the location in the thermal image captured by the second thermal imager and represents as an offset of the point on the focal plane of the first thermal imager and the second thermal imager relative to their optical axis.

In an embodiment, the thermal radiation of the wavelength ranges from 0.9-1.7 µm short wavelength. In another embodiment, the thermal radiation of the wavelength ranges from 3-5 µm middle wavelength. In another embodiment, the thermal radiation of the wavelength ranges from 7.5-14 µm long wavelength.

Yet in another embodiment, the thermal imager array further comprises a shutter that is used to calibrate the thermal imagers.

In embodiments the thermal imager chip is an uncooled Vanadium Oxide or Amorphous Silicon microbolometer, Mercury Cadmium Telluride (MCT), Indium Gallium Arsenide (InGaAs) detector, Indium Antimonide (InSb) detector, or Superlattice Structure detector.

The object(s) of interest can be detected by user input, motion activation, edge detection, shape recognition, or a combination of these.

In another embodiment, the present invention comprises a method of depth measurement utilizing a depth thermal imaging module that comprises a thermal imager array. In the method, the thermal imager array comprises a plurality of thermal imagers that capture thermal radiation of a wavelength of a scene from different viewpoints. Each thermal imager comprises a thermal imager chip, a germanium lens stack, and a focal plane with focal length f.

The thermal imagers are separated by a baseline distance (2h) wherein the depth measurement (Z) is performed on object(s) of interest based on the equation $Z=2hf/\Delta$. In this equation $\Delta$ is the difference in location of the object of interest in the thermal image captured by the first thermal imager and the location of the object in the thermal image captured by the second thermal imager and represents as an offset of the point on the focal plane of the first thermal imager and the second thermal imager relative to their optical axis.

The method for measuring depth using a depth thermal imaging module operates by using a set of thermal imaging data captured utilizing the thermal imager array. Based on the set of thermal imaging data, an object of interest is next detected by user input, motion activation, edge detection, shape recognition, or a combination of these. Next the object of interest is annotated by selecting a set of pixels within the first thermal imaging data. The effects of noise can be reduced by averaging corresponding pixels across thermal images. Depth measurement is then performed on the object of interest by measuring disparity of the object between thermal image data.

The present invention provides a depth measurement method. In an embodiment, the thermal radiation of the wavelength ranges from 0.9-1.7 µm short wavelength. In an embodiment of the method of the present invention the thermal radiation of the wavelength ranges from 3-5 µm middle wavelength. In another embodiment, the thermal radiation of the wavelength ranges from 7.5-14 µm long wavelength. Yet in another embodiment, the thermal imager array further comprises a shutter that is used to calibrate the thermal imager. The thermal imager chip comprises an uncooled Vanadium Oxide or Amorphous Silicon microbolometer, Mercury Cadmium Telluride (MCT), Indium Gallium Arsenide (InGaAs) detector, Indium Antimonide (InSb) detector, or Superlattice Structure detector. The object(s) of interest can be detected by user input, motion activation, edge detection, and shape recognition.

In an embodiment three thermal imagers are utilized to obtain a more accurate result. Each thermal imager comprises a lens stack and a focal plane with focal length f, wherein the three thermal imagers are separated by distances and are on different planes. The field of view of each thermal imager encompasses a scene including a foreground object and a background object. The disparity introduced to different fields of view of the three thermal imagers, is equal to the difference in location of the foreground object between its location in the thermal image captured by the first thermal imager, its location in the thermal image captured by the second thermal imager, and its location in the thermal image captured by the third thermal imager. The distances considered between the three thermal imagers in calculating the depth of the object of interest comprise, for example, forward, rear, vertical, horizontal, leading, lagging, linear, lateral, and angular distances.

The method for measuring depth using a depth thermal imaging module comprising three thermal imagers begins by capturing thermal image data by the thermal imaging array of the depth thermal imaging module. The thermal imaging array comprises three thermal imagers, a first thermal imager, a second thermal imager, and a third thermal imager. Thermal images are captured by the first thermal imager, the second thermal imager, and the third thermal imager. An object of interest is detected in the thermal images captured by the first thermal imager, the second thermal imager, and the third thermal imagers. The object is detected by, for example, user input, motion activation, edge detection, shape recognition, or a combination of these. The detected object is then annotated by selecting a set of pixels within the thermal data of the thermal images captured by the first thermal imager, the second thermal imager, and the third thermal imager.

The effects of noise are reduced by averaging corresponding pixels across the thermal images captured by the first thermal imager, the second thermal imager, and the third thermal imager. The method then performs depth measurement by measuring disparity of the object of interest in thermal images captured by the first thermal imager, the second thermal imager, and the third thermal imager.

In an embodiment of the present invention a plurality of thermal imagers is positioned in various locations on the vehicle in order to capture additional thermal image data in different directions to obtain additional thermal image data for more accurate depth measurement result. Each thermal imager comprises a lens stack and a focal plane with focal length f, wherein all of the plurality of thermal imagers are separated by various distances and are on different planes. The field of view of each thermal imager encompasses a scene including a foreground object and a background object. Since some of the plurality of thermal imagers are aimed in different directions, the field of view differs between some of the thermal imagers. The disparity introduced to different fields of view, for thermal imagers aimed in the same direction, is equal to the difference in location of the foreground object between its location in the thermal image captured by a first thermal imager aimed in a first direction, the object's location in the thermal image captured by a second thermal imager aimed in the first direction, and the object's location in the thermal image captured by the third thermal imager aimed in the first direction. The distances considered between the first thermal imager, the second thermal imager, and the third thermal imager in calculating the depth of the object of interest comprise, for example, forward, rear, vertical, horizontal, leading, lagging, linear, lateral, and angular distances.

At the same time, thermal image data is captured by another plurality of thermal imagers aimed in a second direction. The disparity introduced to different fields of view, for thermal imagers aimed in the second direction, is equal to the difference in location of the foreground object between its location in the thermal image captured by a fourth thermal imager aimed in the second direction and the object's location in the thermal image captured by a fifth thermal imager aimed in the second direction. The distances considered between the fourth thermal imager and the fifth thermal imager in calculating the depth of the object of interest comprise, for example, forward, rear, vertical, horizontal, leading, lagging, linear, lateral, and angular distances.

The method for measuring depth using a depth thermal imaging module with a plurality of thermal imagers aimed in a plurality of directions begins by capturing thermal image data by the thermal imaging array of the depth thermal imaging module. The thermal imaging array comprises, for example, four thermal imagers aimed in a forward direction, four thermal imagers aimed in a rearward direction, two thermal imagers aimed in a rightward direction, and two thermal imagers aimed in a leftward direction. Thermal images are captured by the thermal imagers aimed forward, rearward, leftward, and rightward simultaneously. Objects of interest are detected in the thermal images captured by thermal imagers aimed forward. The object is detected by, for example, user input, motion activation, edge detection, shape recognition, or a combination of these. The forward detected object is then annotated by selecting a set of pixels within the thermal data of the thermal images captured by the thermal imagers aimed forward.

At the same time, objects of interest are detected in the thermal images captured by thermal imagers aimed rearward. The rearward detected object is then annotated by selecting a set of pixels within the thermal data of the thermal images captured by the thermal imagers aimed rearward.

At the same time, objects of interest are detected in the thermal images captured by thermal imagers aimed leftward. The leftward detected object is then annotated by selecting a set of pixels within the thermal data of the thermal images captured by the thermal imagers aimed leftward.

At the same time, objects of interest are detected in the thermal images captured by thermal imagers aimed rightward. The rightward detected object is then annotated by selecting a set of pixels within the thermal data of the thermal images captured by the thermal imagers aimed rightward.

The effects of noise are reduced by averaging corresponding pixels across the thermal images captured by the plurality of thermal imagers aimed in the same direction. The method then performs depth measurement by measuring disparity of the object of interest in thermal images captured by the plurality of thermal imagers aimed in the same direction.

Finally, the plurality of depth measurements is analyzed to extract meaning, make correlations, make relationships, predict effects, determine environment status/situation, etc. The results of the analysis are then transmitted to the vehicle CPU, an onboard control computer, or a remote computer server or network for responsive actions and/or instructions. As a result, the present invention obtains important data regarding the environmental status around the vehicle and allows the appropriate action to be taken by the vehicle.

To achieve at least the above objectives, the present disclosure provides a depth thermal imaging module comprising a thermal imager array for measuring depth of or distance to an object, as exemplified in any one of the above embodiments.

DETAILED DESCRIPTION OF THE INVENTION

To facilitate understanding of the object, characteristics and effects of this present disclosure, embodiments together with the attached drawings for the detailed description of the present disclosure are provided.

Figure 1:
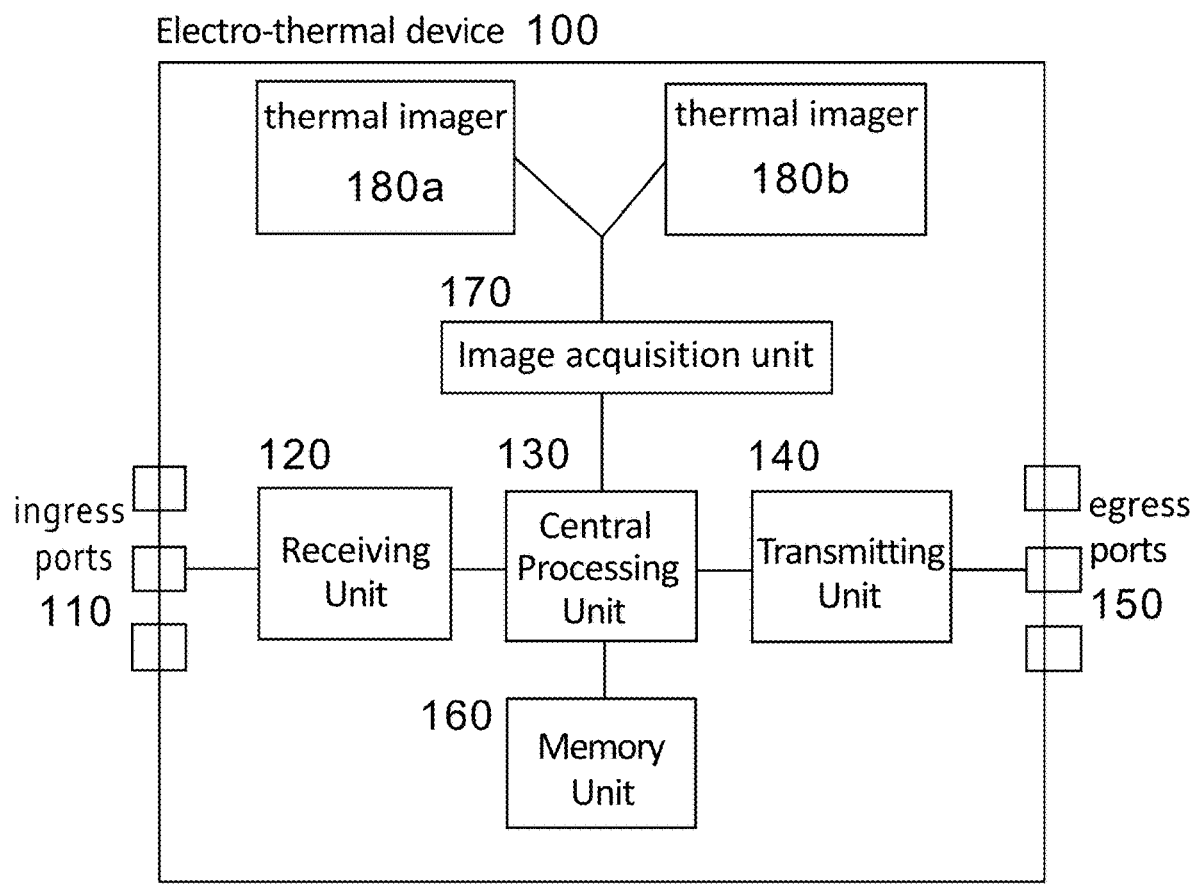
FIG. 1 is a drawing illustrating a depth thermal imaging module according to an embodiment of the present invention.

Refer to FIG. 1, which is a diagrammatic representation of an exemplary system of an electro-thermal module for depth thermal imaging according an embodiment of the present invention. The electro-thermal device 100 comprises ingress ports 110, at least one receiving unit (Rx) 120, a central processing unit 130, at least one transmitting unit (Tx) 140, egress ports 150, a memory unit 160, an image acquisition unit 170, and at least two thermal imagers 180*a*, 180*b*. In another embodiment, the at least two thermal imagers 180*a*, 180*b* are external but still connected to the electro-thermal device 100.

The ingress ports 110 are for connecting with various sensors, detectors, of data collectors/providers, for example, temperature sensors, shock sensors, vibration sensors, speedometers, barometers, altimeters, anemometers, light meters, odometers, chronometers, hygrometers, electronic compasses, global positioning systems (GPS), remote computer servers, or remote computer networks.

The egress ports 150 are for connecting with various devices, for example, the vehicle's CPU, onboard computer/control system, or remote computer server/network.

The central processing unit 130 processes data by utilizing one or more computer chip(s) such as field programmable gate arrays (FPGAs), application specific integrated circuits (ASICs), digital signal processors (DSPs), microprocessors, image preprocessors, and graphic processors capable of running applications and performing image processing and analysis.

The processing unit 130 receives input data or control signals from the ingress ports 110 via the receiving unit 120. The processing unit 130 also stores and retrieves data, or programs to and from the memory unit 160. The memory unit 160 comprises, for example, tape drives, solid state drives, or flash memory. The memory unit 160 comprises, for example, volatile, non-volatile, read-only memory (ROM), random access memory (RAM), ternary content-addressable memory (TCAM), static random-access memory (SRAM), or a combination thereof.

The processing unit 130 also exports data to the egress ports 150 via the transmitting unit 140. The transmitting unit 140 comprises, for example, one or more devices configured to exchange transmissions wirelessly using standards such as WiFi, Bluetooth, Bluetooth Smart, 802.15.4, and ZigBee from the host vehicle to one or more remotely located servers or other vehicles to coordinate navigation. The processing unit 130 communicates with the image acquisition unit 170 which receives thermal images from a plurality of thermal imagers comprising at least two thermal imagers (180*a*, 180*b*) where each of the thermal imagers has a different field of view.

Figure 2:
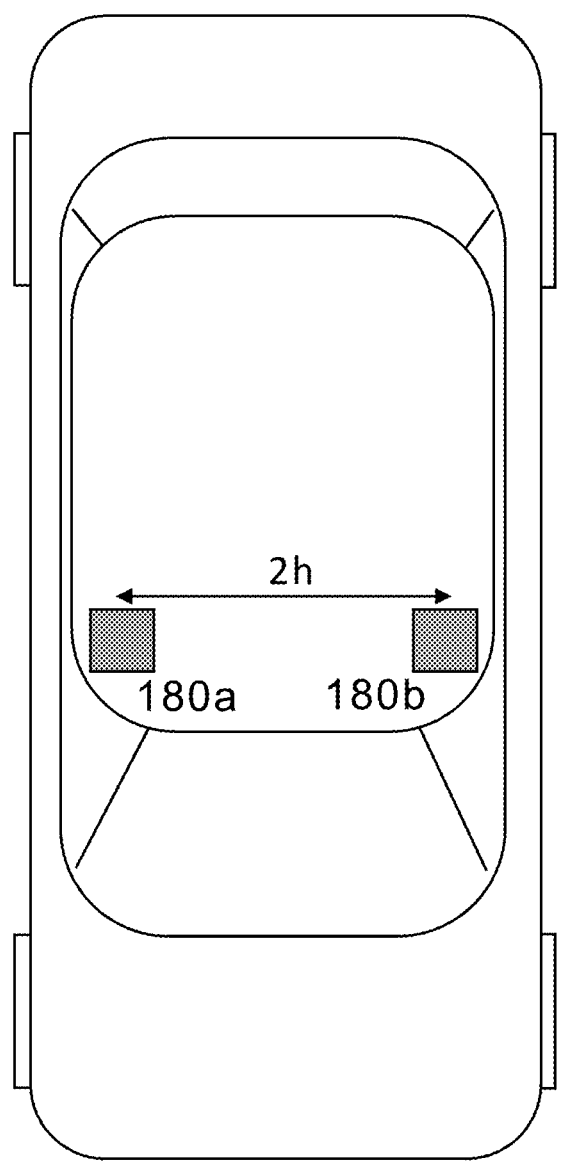
FIG. 2 is a drawing illustrating a top view representation of a vehicle including a depth thermal imaging module comprising two thermal imagers located on a vehicle rooftop according to an embodiment of the present invention.

Refer to FIG. 2, which is a diagrammatic top view representation of a vehicle comprising a depth thermal imaging module that comprises two thermal imagers with a first thermal imager device 180*b* positioned on a vehicle rooftop in the vicinity of the driver seat and with a second thermal imager device 180*a* positioned on the vehicle rooftop in the vicinity of the front passenger seat of the vehicle. The first thermal imager device 180*b* and the second thermal imager device 180*a* form a thermal imager array. The disclosed embodiments are not limited to any particular number and position of the thermal imagers in any appropriate location on the vehicle. It is noted that thermal imagers are not positioned within the interior of the vehicle since thermal radiation from an object cannot pass through the vehicle glass.

It is to be understood that the disclosed embodiments are not limited to vehicles and could be applied in other contexts. It is also to be understood that disclosed embodiments are not limited to a particular type of vehicle and may be applicable to all types of vehicles including automobiles, trucks, trailers, and other types of vehicles.

In one embodiment, the thermal imager comprises an uncooled Focal Plane Array (FPA) 640×512 pixel 12-micron FLIR Boson VOx microbolometer and comprises a shutter. Infrared radiation with long wavelengths (LWIR) between 7.5-14 µm strikes the microbolometer detector material such as Vanadium Oxide or Amorphous Silicon, heats it, and thus changes its electrical resistance. This resistance change is measured and processed into temperatures which can be used to create an image. Unlike other types of infrared detecting equipment, microbolometers do not require cooling.

In another embodiment, the thermal imager provides a resolution of 1024×768 (XGA) or 640×480 (VGA) or 336× 256 or 384×288 (QVGA) or 320×240 (QVGA) or 160×120

(QVGA) or 80×80 (Low resolution) 80×60 (Low resolution) pixels. The thermal imager comprises one or more lenses to provide a desired focal length and field of view configured to have a horizontal Field Of View (FOV) such as within a range of 17 degrees to 90 degrees, including a 17 degree FOV, 24 degree FOV, 32 degree FOV, 49 degree FOV, 70 degree FOV, or 90 degree FOV. In an embodiment, the thermal imager is configured to have a wide FOV in the range of 100 to 360 degrees.

In another embodiment, the thermal imager has a refresh rate of 9 or 30 or 60 Hz. Yet in another embodiment, the thermal imager is a cooled mid (3-5 um) infrared wavelength (MWIR) Mercury Cadmium Telluride (MCT), Indium Gallium Arsenide (InGaAs) detector, Indium Antimonide (InSb) detector, or Superlattice Structure detector. In some embodiments, the imager comprises 1280×720 pixels (High Definition), or 1280×1024 pixels (High Definition), or 1024×768 pixels (XGA), or 640×512 pixels (VGA).

Depth measurement has never been used in a thermal imager, which is a special type of imager that captures thermal radiation between 0.9-1.7 μm short wavelength, 3-5 μm middle wavelength, or between 7.5-14 μm long wavelength from objects. Therefore, the present invention provides depth measurement based on parallax from an array of thermal imagers.

Depth measurement is performed using a plurality of at least two thermal imagers that capture thermal images of a scene where the thermal image obtained by each thermal imager is from a slightly different viewpoint. The depth thermal imaging module comprises two or more thermal imagers, each of which receives thermal radiation through a separate germanium lens system. The captured thermal images are compared by shifting the pixels of two or more thermal images to find parts of the thermal images that match. Depth of an object of interest is calculated by observing the disparity, or difference, in the location of corresponding pixels making up the object (pixels) that capture the same content in a scene in the images from two different imagers. Eventually the disparity gets smaller than a certain threshold sub-pixel amount for the given pixel size, and the resolution of depth measurement thus becomes more coarsely quantized with greater depth.

Figure 3:
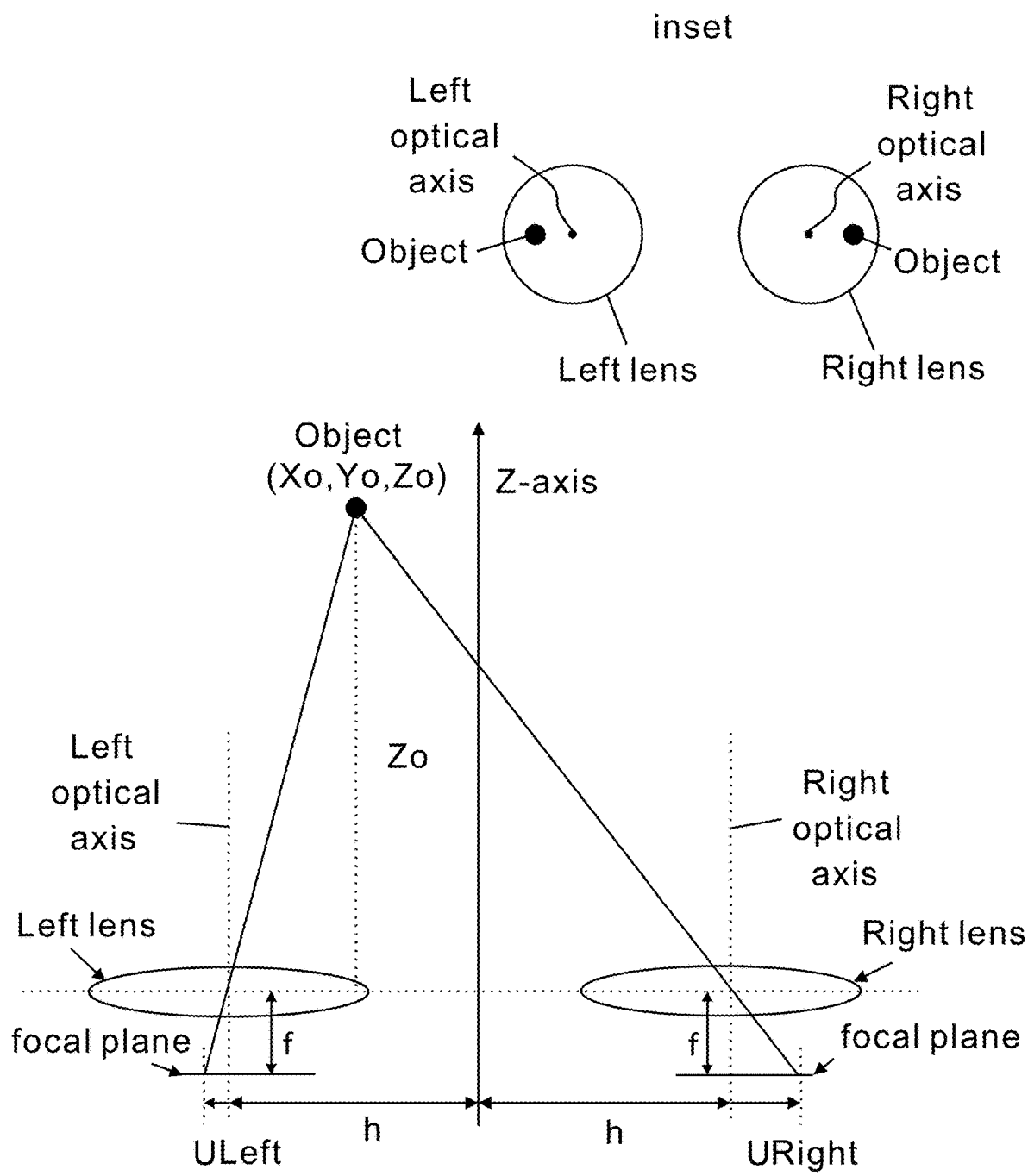
FIG. 3 is a drawing illustrating parallax effect of a depth thermal imaging module comprising a thermal imager array comprising two thermal imagers according to an embodiment of the present invention.

Parallax in a two imager system is illustrated in FIG. 3. Each thermal imager comprises a lens stack and a focal plane with focal length f, wherein the two thermal imagers are separated by a baseline distance of 2h. The field of view of each thermal imager encompasses a scene including a foreground object and a background object. The disparity introduced to different fields of view of the two thermal imagers, is equal to the difference in location of the foreground object between its location in the image captured by the first thermal imager and its location in the image captured by the second thermal imager wherein an offset of the point on the focal plane of the first thermal imager and the second thermal imager relative to its optical axis is shown as $U_{left}$ and $U_{right}$.

Depth of a target object $Z_o = 2hf/\Delta_{parallax}$ where $\Delta_{parallax} = U_{right} - U_{left}$. The closer an object is to the array thermal imager ($Z_o$), the larger the disparity ($\Delta_{parallax}$).

Figure 4:
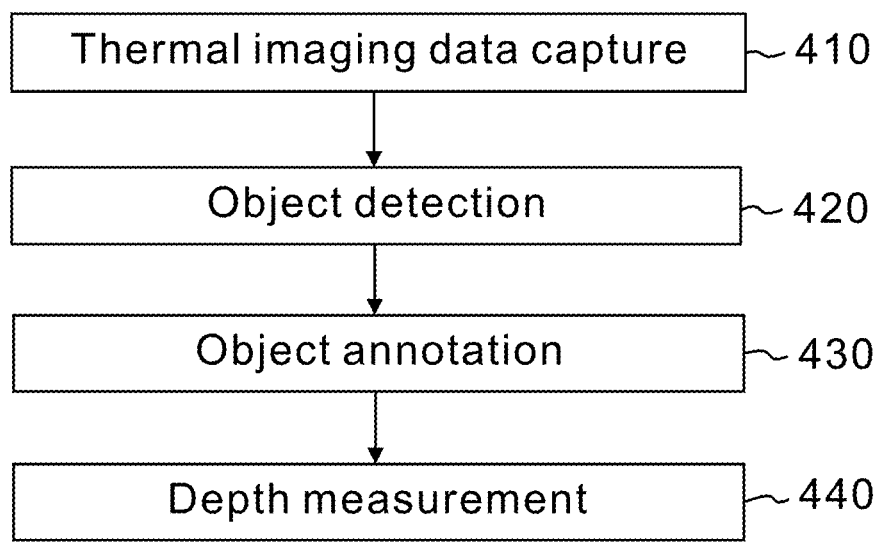
FIG. 4 is a flowchart illustrating a method for measuring depth using a depth thermal imaging module comprising two thermal imagers according to an embodiment of the present invention.

Refer to FIG. 4, which illustrates a flowchart showing an exemplary method for measuring depth using a depth thermal imaging module in accordance with embodiments of the invention. To operate, a set of thermal imaging data (410) is captured using the thermal imager array. Based on the set of thermal imaging data, an object of interest (420) is next detected by, but not limited to, user input, motion activation, edge detection, and/or shape recognition. Next the object(s) is annotated (430) by selecting a set of pixels within the thermal imaging data. The effects of noise can be reduced by averaging corresponding pixels across images. Depth measurement (440) is then performed on the object(s) by measuring disparity of the object(s).

Figure 5:
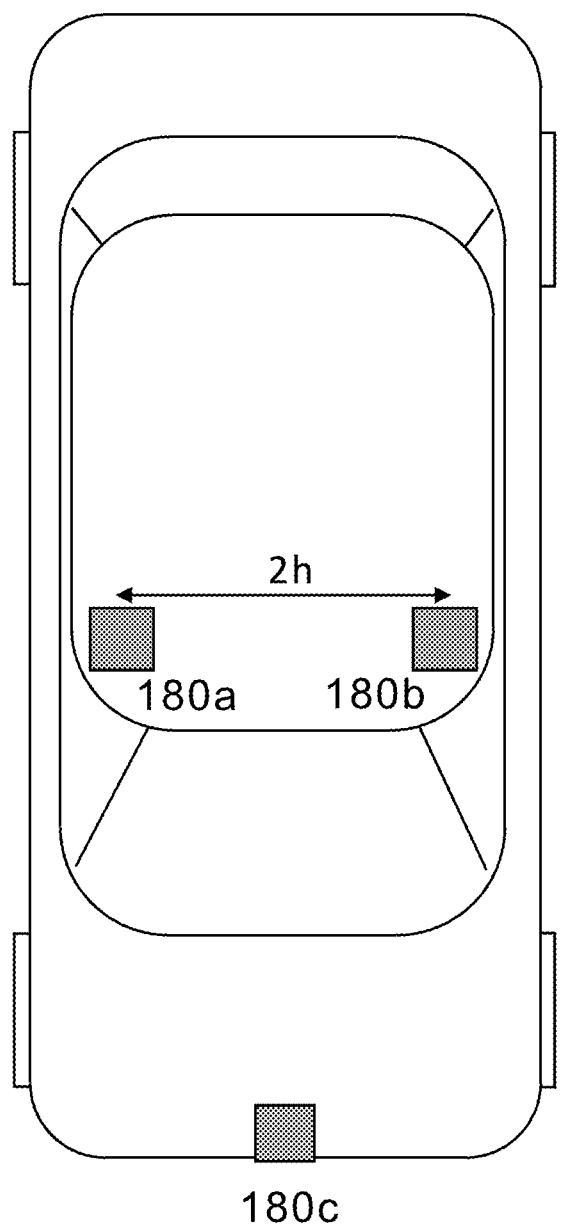
FIG. 5 is a drawing illustrating a top view representation of a vehicle including a depth thermal imaging module comprising three thermal imagers, two thermal imagers located on a vehicle rooftop and one thermal imager located on a front of the vehicle, according to an embodiment of the present invention.

Refer to FIG. 5, which is a drawing illustrating a top view representation of a vehicle including a depth thermal imaging module. In the embodiment illustrated in FIG. 5, the depth thermal imaging module comprises three thermal imagers. Two of the thermal imagers 180a, 180b are located on a vehicle rooftop and a third thermal imager 180c is located on the front area of the vehicle. The location of the third thermal imager 180c is, for example, in/on the bumper, the fender, the grill, or the hood of the vehicle.

The first thermal imager device 180b, the second thermal imager device 180a, and the third thermal imager device 180c form a thermal imager array.

Each thermal imager comprises one or more lenses to provide a desired focal length and field of view configured to have a Field Of View (FOV)

The present invention provides depth measurement based on parallax from an array of thermal imagers. In the embodiment illustrated in FIG. 5, depth measurement is performed using the three thermal imagers 180a, 180b, 180c that capture thermal images of a scene where the thermal image obtained by each thermal imager 180a, 180b, 180c is from a slightly different viewpoint. The depth thermal imaging module in an embodiment comprises three thermal imagers, each of which receives thermal radiation through a separate germanium lens system. The captured thermal images are compared by shifting the pixels of three or more thermal images to find parts of the thermal images that match. Depth of an object of interest is calculated by observing the disparity, or difference, in the location of corresponding pixels making up the object (pixels) that capture the same content in a scene in the thermal images from the three different thermal imagers. Eventually the disparity gets smaller than a certain threshold sub-pixel amount for the given pixel size, and the resolution of depth measurement thus becomes more coarsely quantized with greater depth.

In this embodiment the thermal imagers are on different planes, with two imagers on the roof of the vehicle and one imager on the front of the vehicle at a lower height. By positioning the thermal imagers in a higher/left/right and a lower center location, a more accurate depth measurement of an object can be obtained. These different positions allow the present invention to effectively perform in numerous lighting (night, sun glare, high contrast) and weather (snow, fog, rain, dust, smoke) conditions.

With lower or higher height positioning of the thermal imagers better thermal images and improved identification of the object of interest and its position can be obtained.

Figure 6:
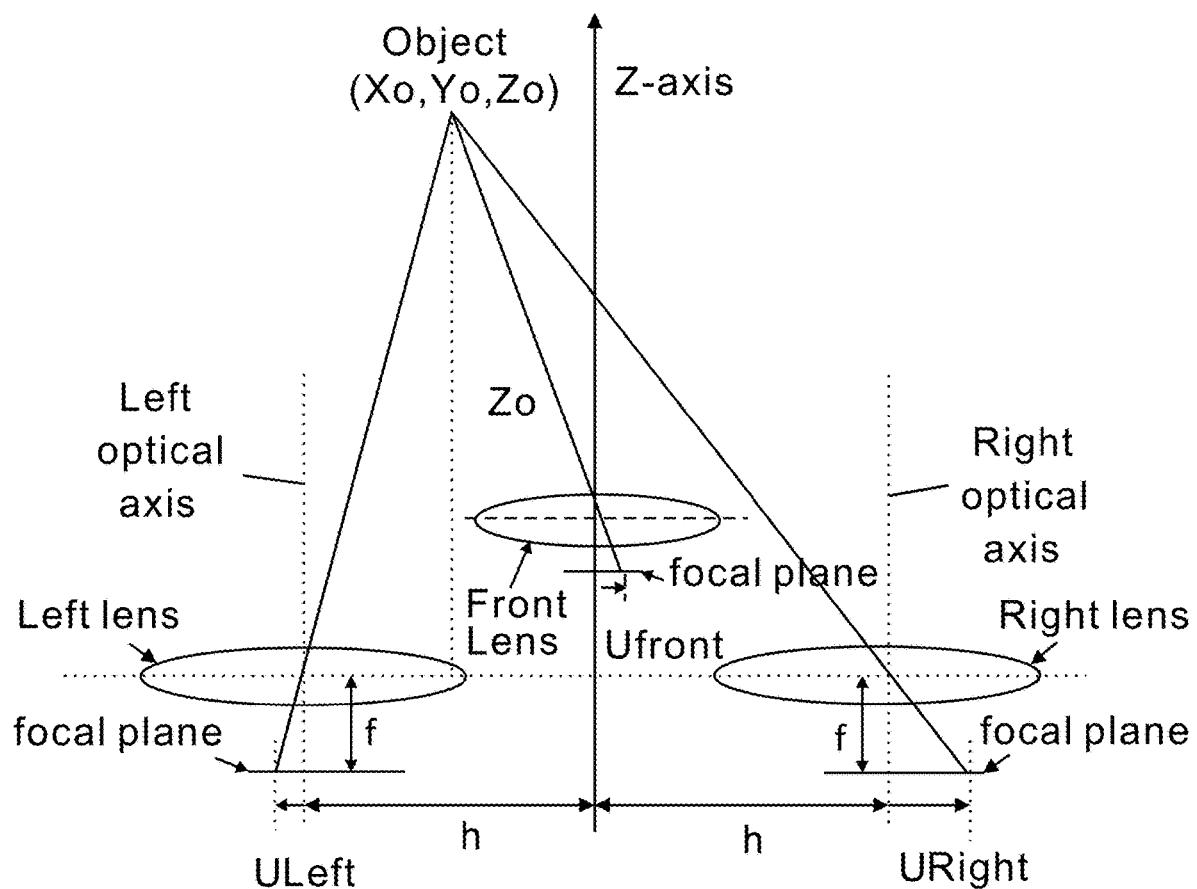
FIG. 6 is a drawing illustrating parallax effect of a depth thermal imaging module comprising a thermal imager array comprising three thermal imagers according to an embodiment of the present invention.

Refer to FIG. 6. Parallax in a three thermal imager system is similar to that as shown in FIG. 3. However, in this embodiment three thermal imagers are utilized to obtain a more accurate result. Each thermal imager comprises a lens stack and a focal plane with focal length f, wherein the three thermal imagers are separated by distances. The field of view of each imager encompasses a scene including a foreground object and a background object. The disparity introduced to different fields of view of the three thermal imagers, is equal to the difference in location of the foreground object between its location in the thermal image captured by the first thermal imager, its location in the thermal image captured by the second thermal imager, and its location in the thermal image captured by the third thermal imager.

Depth of a target object $Z_o$ utilizes $\Delta_{parallax}$, with $U_{right}$, $U_{left}$, and $U_{front}$. The closer an object is to the array thermal imager ($Z_o$), the larger the disparity ($\Delta_{parallax}$).

In embodiments of the present invention, the distances considered between the three thermal imagers in calculating the depth of the object comprise, for example, forward, rear, vertical, horizontal, leading, lagging, linear, lateral, and angular distances.

Figure 7:
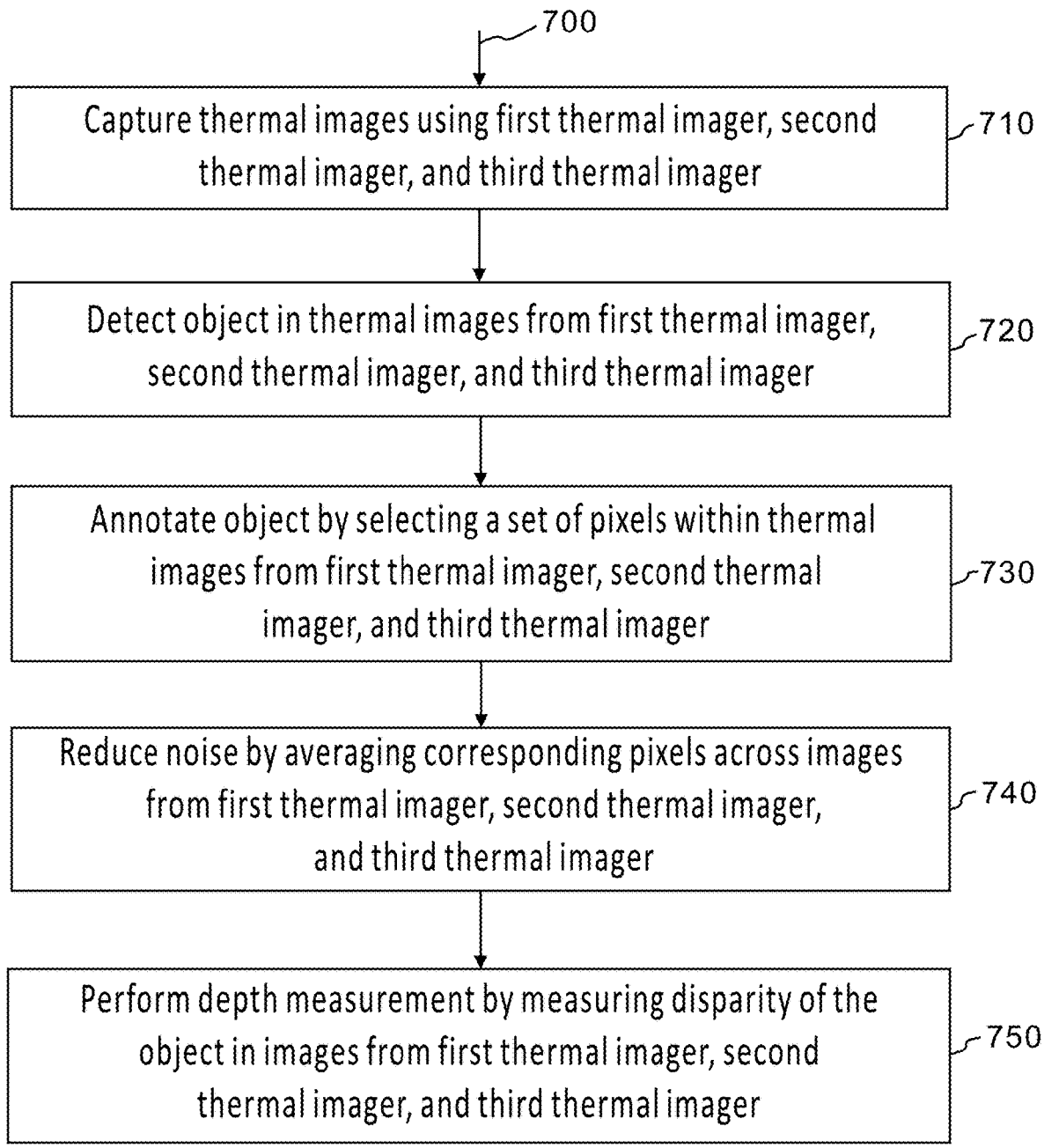
FIG. 7 is a flowchart showing an exemplary method for measuring depth using a depth thermal imaging module with three thermal imagers in accordance with embodiments of the present invention.

Refer to FIG. 7, which illustrates a flowchart showing an exemplary method for measuring depth using a depth thermal imaging module with three thermal imagers in accordance with embodiments of the invention. In other embodiments, a plurality of more than three thermal imagers are utilized while following a similar method as illustrated in FIG. 7.

The method 700 begins in Step 710 by capturing thermal image data by the thermal imaging array of the depth thermal imaging module. In this embodiment the thermal imaging array comprises three thermal imagers (first thermal imager 180b, second thermal imager 180a, third thermal imager 180c of FIG. 5). Thermal images are captured by the first thermal imager, the second thermal imager, and the third thermal imagers.

In Step 720, the object of interest is detected in the thermal images captured by the first thermal imager, the second thermal imager, and the third thermal imagers. The object is detected by, for example, user input, motion activation, edge detection, shape recognition, or a combination of these.

Next, the detected object is annotated by selecting a set of pixels within the thermal data of the thermal images captured by the first thermal imager, the second thermal imager, and the third thermal imager in Step 730.

The effects of noise are reduced in Step 740 by averaging corresponding pixels across the thermal images captured by the first thermal imager, the second thermal imager, and the third thermal imager.

Finally, in Step 750, the method performs depth measurement by measuring disparity of the object in images captured by the first thermal imager, second thermal imager, and third thermal imager.

Figure 8:
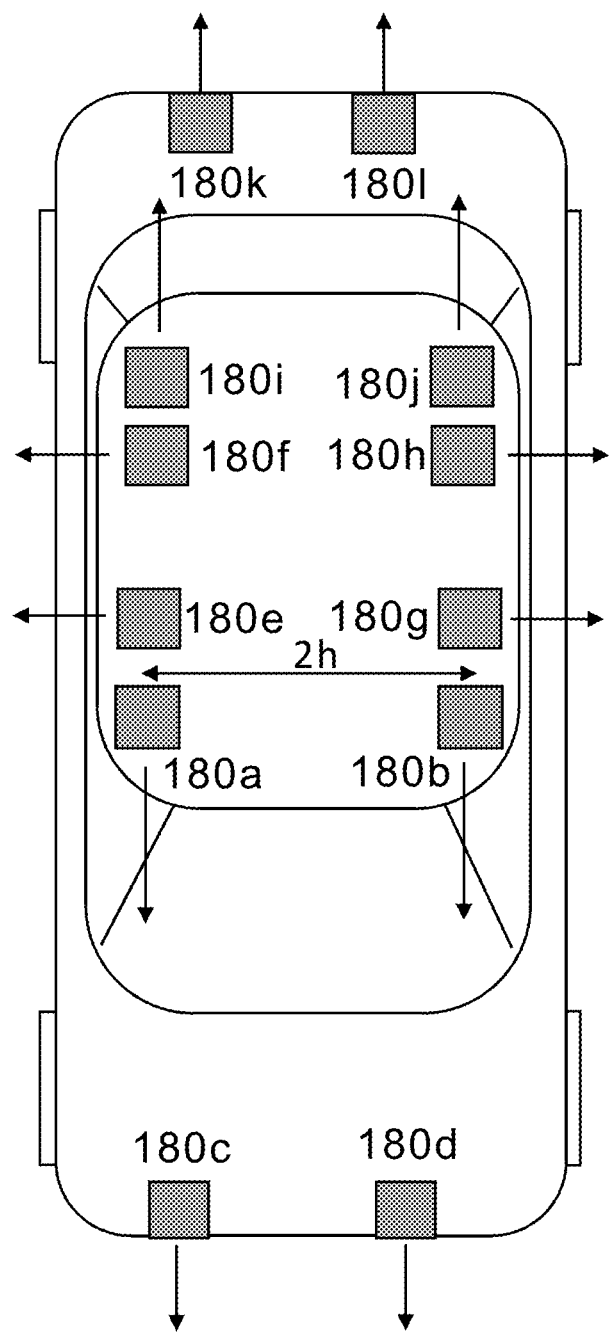
FIG. 8 is a drawing illustrating a top view representation of a vehicle including a depth thermal imaging module comprising a plurality of thermal imagers aimed in a plurality of directions according to an embodiment of the present invention.

Refer to FIG. 8, which is a drawing illustrating a top view representation of a vehicle including a depth thermal imaging module comprising a plurality of thermal imagers aimed in a plurality of directions according to an embodiment of the present invention.

In embodiments the present invention comprises a plurality of thermal imagers positioned in various locations on the vehicle in order to capture additional thermal image data in different directions to obtain a more accurate depth measurement result.

In the embodiment illustrated in FIG. 8, the method for measuring depth using a depth thermal imaging module comprises two front thermal imagers 180c, 180d; two forward thermal imagers 180a, 180b; two rear thermal imagers 180k, 180l; two rearward thermal imagers 180i, 180j; two leftward thermal imagers 180g, 180h; and two rightward thermal imagers 180e, 180f.

The two front thermal imagers 180c, 180d and the two forward thermal imagers 180a, 180b are aimed in a forward direction to capture thermal image data in front of or in the forward direction of the vehicle.

The two rear thermal imagers 180k, 180l and the two rearward thermal imagers 180i, 180j are aimed in a rearward direction to capture thermal image data in back of or in the rearward direction of the vehicle.

The two leftward thermal imagers 180g, 180h are aimed in a leftward direction to capture thermal image data to the left of or in the leftward direction of the vehicle.

The two rightward thermal imagers 180e, 180f are aimed in a rightward direction to capture thermal image data to the right of or in the rightward direction of the vehicle.

Each thermal imager comprises a lens stack and a focal plane with focal length f, wherein all of the plurality of thermal imagers are separated by various distances and some thermal imagers are on different planes. The field of view of each thermal imager encompasses a scene including a foreground object and a background object. Since some of the plurality of thermal imagers are aimed in different directions, the field of view differs between some of the thermal imagers. The disparity introduced to different fields of view, for thermal imagers aimed in the same direction, is equal to the difference in location of the foreground object between its location in the thermal image captured by the left front thermal imager 180d aimed in the forward direction, the object's location in the thermal image captured by the right front thermal imager 180c aimed in the forward direction, the object's location in the thermal image captured by the left forward thermal imager 180b aimed in the forward direction, and the object's location in the thermal image captured by the right forward thermal imager 180a aimed in the forward direction.

The distances considered between the left front thermal imager 180d, the right front thermal imager 180c, the left forward thermal imager 180b, and the right forward thermal imager 180a in calculating the depth of the object of interest comprise, for example, forward, rear, vertical, horizontal, leading, lagging, linear, lateral, and angular distances.

Simultaneously, thermal image data is captured by another plurality of thermal imagers aimed in a rearward direction. The disparity introduced to different fields of view, for thermal imagers aimed in the rearward, is equal to the difference in location of the foreground object between its location in the thermal image captured by the left rear thermal imager 180l aimed in the rearward direction, the object's location in the thermal image captured by the right rear thermal imager 180k aimed in the rearward direction, the object's location in the thermal image captured by the left rearward thermal imager 180j aimed in the rearward direction, and the object's location in the thermal image captured by the right rearward thermal imager 180i aimed in the rearward direction.

Similarly, thermal image data is captured by the two leftward thermal imagers 180g, 180h which are aimed in a leftward direction. The disparity introduced to different fields of view, for thermal imagers aimed leftward, is equal to the difference in location of the foreground object between its location in the thermal image captured by the front left thermal imager 180g aimed in the leftward direction and the object's location in the thermal image captured by the rear left thermal imager 180h aimed in the leftward direction.

Also, thermal image data is captured by the two rightward thermal imagers 180e, 180f which are aimed in a rightward direction. The disparity introduced to different fields of view, for thermal imagers aimed rightward, is equal to the difference in location of the foreground object between its location in the thermal image captured by the front right thermal imager 180e aimed in the rightward direction and the object's location in the thermal image captured by the rear right thermal imager 180f aimed in the rightward direction The method for measuring depth using a depth thermal imaging module with a plurality of thermal imagers aimed in a plurality of directions begins by capturing thermal image data by the thermal imaging array of the depth thermal imaging module. The thermal imaging array comprises, for example, four thermal imagers aimed in a forward direction, four thermal imagers aimed in a rearward direction, two thermal imagers aimed in a rightward direction, and two thermal imagers aimed in a leftward direction. Thermal images are captured by the thermal imagers aimed forward, rearward, leftward, and rightward simultaneously. Objects of interest are detected in the thermal images captured by thermal imagers aimed forward. The object is detected by, for example, user input, motion activation, edge detection, shape recognition, or a combination of these. The detected object is then annotated by selecting a set of pixels within the thermal data of the thermal images captured by the thermal imagers aimed forward.

At the same time, objects of interest are detected in the thermal images captured by thermal imagers aimed rearward. The detected object is then annotated by selecting a set of pixels within the thermal data of the thermal images captured by the thermal imagers aimed rearward.

At the same time, objects of interest are detected in the thermal images captured by thermal imagers aimed leftward. The detected object is then annotated by selecting a set of pixels within the thermal data of the thermal images captured by the thermal imagers aimed leftward.

At the same time, objects of interest are detected in the thermal images captured by thermal imagers aimed rightward. The detected object is then annotated by selecting a set of pixels within the thermal data of the thermal images captured by the thermal imagers aimed rightward.

The effects of noise are reduced by averaging corresponding pixels across the thermal images captured by the plurality of thermal imagers aimed in the same direction. The method then performs depth measurement by measuring disparity of the object of interest in thermal images captured by the plurality of thermal imagers aimed in the same direction.

Finally, the plurality of depth measurements is analyzed to extract meaning, make correlations, establish relationships, predict effects, determine environment status/situation, etc. The results of the analysis are then transmitted to the vehicle CPU, an onboard control computer, or a remote server for responsive actions and/or instructions.

As a result, the present invention obtains important data regarding the environmental status around the vehicle and allows the appropriate action to be taken by the vehicle.

While the present disclosure has been described by means of specific embodiments, numerous modifications and variations could be made thereto by those skilled in the art without departing from the scope and spirit of the present disclosure set forth in the claims.

What is claimed is:

1. A depth thermal imaging module comprising:
a thermal imager array comprising:
a plurality of at least two thermal imagers for capturing thermal radiation of a wavelength of a scene from different viewpoints, each imager comprising:
a thermal imager chip,
a lens stack, and
a focal plane with focal length f, wherein the thermal imagers are separated by a baseline distance of 2h and depth measurement Z is performed on an object of interest based on $Z=2hf/\Delta$ where $\Delta$ is the difference in location of the object in an image captured by a first one of the thermal imagers and location of the object in an image captured by a second one of the thermal imagers and represents an offset of a point on the focal plane of the first thermal imager and the second thermal imager relative to the optical axis.

2. The depth thermal imaging module of claim 1, wherein thermal radiation of the wavelength ranges from 0.9-1.7 μm wavelength.

3. The depth thermal imaging module of claim 1, wherein thermal radiation of the wavelength ranges from 3-5 μm wavelength.

4. The depth thermal imaging module of claim 1, wherein thermal radiation of the wavelength ranges from 7.5-14 μm wavelength.

5. The depth thermal imaging module of claim 1, wherein the thermal imager chip comprises an uncooled Vanadium Oxide or Amorphous Silicon microbolometer.

6. The depth thermal imaging module of claim 1, wherein the thermal imager chip comprises a Mercury Cadmium Telluride (MCT), Indium Antimonide (InSb) detector, Indium Gallium Arsenide (InGaAs) detector, or Superlattice Structure detector.

7. The depth thermal imaging module of claim 1, wherein the object of interest is identified by user input, motion activation, edge detection, shape recognition, or a combination of user input, motion activation, edge detection, and shape recognition.

8. The depth thermal imaging module of claim 1, the thermal imager array further comprising a shutter for calibrating the plurality of at least two thermal imagers.

9. A method of depth measurement utilizing a depth thermal imaging module comprising:
capturing thermal imaging data using a plurality of thermal imagers;
detecting an object in the thermal imaging data;
annotating the object; and
measuring depth of the object.

10. The method of depth measurement utilizing a depth thermal imaging module of claim 9, wherein the plurality of thermal imagers is separated by a baseline distance and depth measurement is performed on an object of interest by determining the difference in location of the object in an image captured by a first one of the thermal imagers and location of the object in an image captured by a second one of the thermal imagers.

11. The method of depth measurement utilizing a depth thermal imaging module of claim 9, wherein the plurality of thermal imagers are separated by a baseline distance of 2h and depth measurement Z is performed on the object based on Z is proportional to $2h/\Delta$, where $\Delta$ is a difference in location of the object in an image captured by a first thermal imager and location of the object in an image captured by a second thermal imager and represents an offset of a point relative to an optical axis of the first thermal imager and the second thermal imager.

12. The method of depth measurement utilizing a depth thermal imaging module of claim 9, wherein the object is annotated by selecting a set of pixels within the thermal imaging data.

13. The method of depth measurement utilizing a depth thermal imaging module of claim 9, wherein noise effects are reduced by averaging corresponding pixels across thermal images.

14. The method of depth measurement utilizing a depth thermal imaging module of claim 9, wherein depth measurement is performed on the object by measuring disparity of the object.

15. A depth thermal imaging module comprising:
a plurality of at least two thermal imagers for capturing thermal radiation of a wavelength of a scene from different viewpoints;
wherein the thermal imagers are separated by a baseline distance and depth measurement is performed on an object of interest by determining the difference in location of the object in an image captured by a first one of the thermal imagers and location of the object in an image captured by a second one of the thermal imagers.

16. The depth thermal imaging module of claim 15, each thermal imager comprising:
a thermal imager chip.

17. The depth thermal imaging module of claim 15, each thermal imager comprising:
at least one lens.

18. The depth thermal imaging module of claim 15, wherein the thermal imagers are separated by the baseline distance of 2h and depth measurement Z is performed on the object of interest based on $Z=2hf/\Delta$ where $\Delta$ is the difference in location of the object in the image captured by the first one of the thermal imagers and location of the object in the image captured by the second one of the thermal imagers and represents an offset of a point on the focal plane with focal length f of the first thermal imager and the second thermal imager relative to the optical axis.

19. The depth thermal imaging module of claim 15, wherein the thermal imagers are separated by the baseline distance of 2h and depth measurement Z is performed on the object of interest based on Z is proportional to $2h/\Delta$ where $\Delta$ is the difference in location of the object in the image captured by the first one of the thermal imagers and location of the object in the image captured by the second one of the thermal imagers and represents an offset of a point on a focal plane of the first thermal imager and the second thermal imager relative to the optical axis.

20. The depth thermal imaging module of claim 15, wherein thermal radiation of the wavelength ranges from 0.9-1.7 µm wavelength.

21. The depth thermal imaging module of claim 15, wherein thermal radiation of the wavelength ranges from 3-5 µm wavelength.

22. The depth thermal imaging module of claim 15, wherein thermal radiation of the wavelength ranges from 7.5-14 µm wavelength.

23. The depth thermal imaging module of claim 16, wherein the thermal imager chip comprises an uncooled Vanadium Oxide or Amorphous Silicon microbolometer.

24. The depth thermal imaging module of claim 16, wherein the thermal imager chip comprises a Mercury Cadmium Telluride (MCT), Indium Antimonide (InSb) detector, Indium Gallium Arsenide (InGaAs) detector, or Superlattice Structure detector.

25. The depth thermal imaging module of claim 15, wherein the object of interest is identified by user input, motion activation, edge detection, shape recognition, or a combination of user input, motion activation, edge detection, and shape recognition.

* * * * *